(12) United States Patent
Khanka et al.

(10) Patent No.: US 8,244,186 B1
(45) Date of Patent: Aug. 14, 2012

(54) AUDIO-BASED POWER CONTROL FOR A WIRELESS COMMUNICATION DEVICE

(75) Inventors: Bhagwan Singh Khanka, Lenexa, KS (US); Anoop Kumar Goyal, Overland Park, KS (US); Hemanth Balaji Pawar, Herndon, VA (US); Shilpa Kowdley Srinivas, Herndon, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 809 days.

(21) Appl. No.: 12/257,722

(22) Filed: Oct. 24, 2008

(51) Int. Cl.
*H04B 17/00* (2006.01)
(52) U.S. Cl. .................. 455/67.11; 455/67.14; 455/522
(58) Field of Classification Search .... 455/67.11–67.14, 455/522, 445, 433, 561; 370/252
See application file for complete search history.

(56) References Cited

U.S. PATENT DOCUMENTS

| | | | |
|---|---|---|---|
| 7,233,796 B2 * | 6/2007 | Niemela et al. | 455/445 |
| 7,239,886 B2 | 7/2007 | Gross et al. | |
| 8,055,201 B1 * | 11/2011 | Kuan | 455/67.11 |
| 2006/0252376 A1 * | 11/2006 | Fok et al. | 455/67.13 |
| 2008/0132267 A1 * | 6/2008 | Cave et al. | 455/522 |
| 2008/0207247 A1 * | 8/2008 | Gholmieh et al. | 455/522 |

* cited by examiner

*Primary Examiner* — Lana N Le
*Assistant Examiner* — Golam Sorowar (57) ABSTRACT

An audio sample is wirelessly transferred between a wireless communication device and a wireless base station. Either the wireless communication device or the wireless base station processes the audio sample to determine an audio quality level. The wireless base station determines a power level indicator for the wireless communication device based on the audio quality level. The wireless communication device adjusts its wireless transmit power in response to the power level indicator.

9 Claims, 8 Drawing Sheets

AUDIO-BASED POWER CONTROL FOR A WIRELESS COMMUNICATION DEVICE

TECHNICAL BACKGROUND

A wireless telephone and a wireless base station exchange information to provide a wireless telephone service to the telephone user. The wireless telephone periodically changes its transmit power in response to power control instructions from the wireless base station. The wireless base station controls the transmit power based on the status of the surrounding Radio Frequency (RF) environment. The RF status is measured with metrics, such as RF frame errors, RF signal-to-noise ratios, and RF noise levels.

OVERVIEW

In a wireless communication system, a wireless base station wirelessly transfers an audio sample to a wireless communication device. The wireless communication device processes the audio sample to determine an audio quality level. The wireless communication device wirelessly transfers the audio quality level to the wireless base station. The wireless base station determines a power level indicator for the wireless communication device based on the audio quality level. The wireless base station wirelessly transfers the power level indicator to the wireless communication device. The wireless communication device adjusts its wireless transmit power in response to the power level indicator.

In a wireless communication system, a wireless communication device wirelessly transfers an audio sample to a wireless base station. The wireless base station processes the audio sample to determine an audio quality level. The wireless base station determines a power level indicator for the wireless communication device based on the audio quality level. The wireless base station wirelessly transfers the power level indicator to the wireless communication device. The wireless communication device adjusts its wireless transmit power in response to the power level indicator.

DETAILED DESCRIPTION

Figure 1:
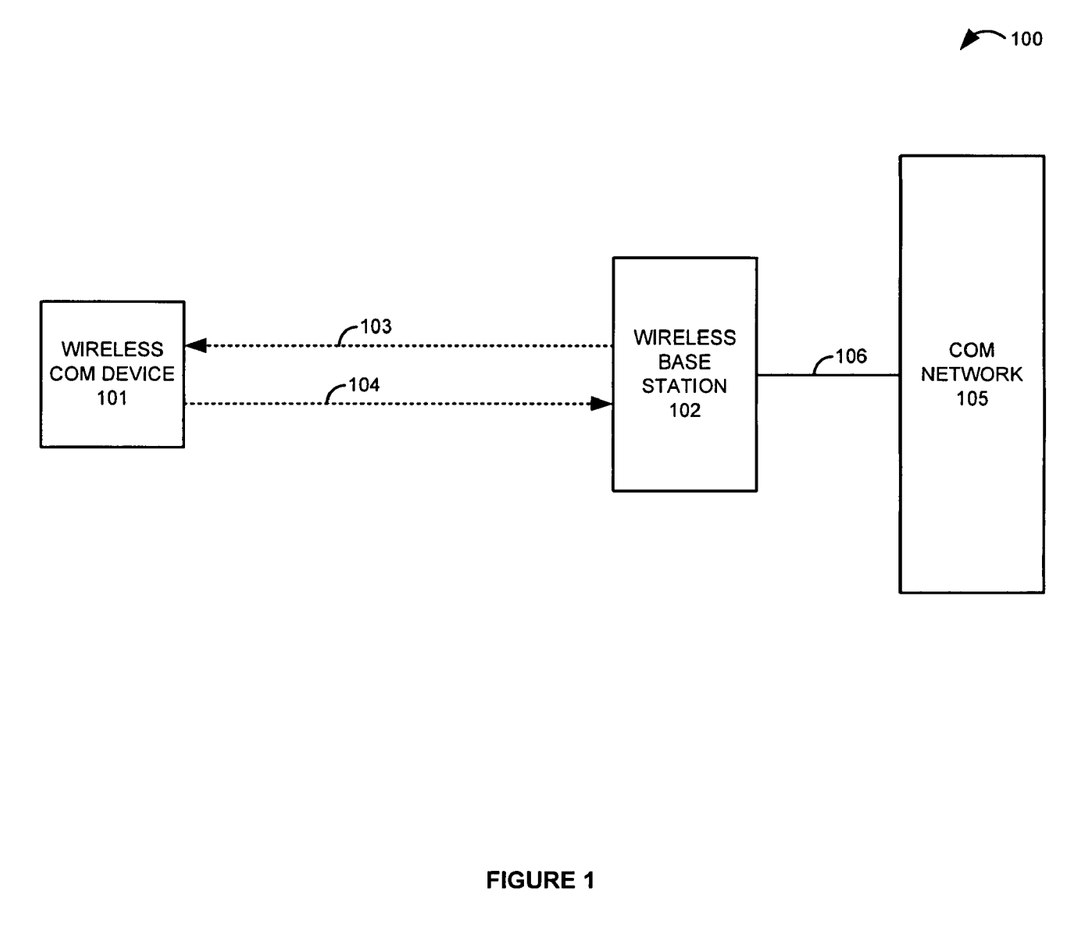
FIG. 1 illustrates a wireless communication system.

FIG. 1 is illustrates wireless communication system 100. Wireless communication system 100 includes wireless communication device 101 and wireless base station 102. Wireless communication device 101 and wireless base station 102 communicate over wireless communication links 103-104. Wireless communication system 100 may include additional wireless communication devices and base stations that operate as described herein, but the number shown on FIG. 1 has been restricted for clarity.

Wireless communication device 101 comprises a telephone, RF transceiver, computer, digital assistant, Internet access device, or some other wireless communication apparatus—including combinations thereof. Wireless base station 102 comprises antennas, transceivers, amplifiers, filters, signal processors, computers, routers, servers, gateways, communication links, or some other communication components—including combinations thereof. Wireless base station 102 may be distributed among several devices that are located at different locations in a geographic area. For example, base station 103 may include an antenna, RF transceiver, and network gateway that are each located at a distance from one another.

Wireless communication link 103 comprises a forward link that wirelessly transfers information from wireless base station 102 to wireless communication device 101. Wireless communication link 104 comprises a reverse link that wirelessly transfers information from wireless communication device 101 to wireless base station 102. Wireless communication links 103-104 use the air or space as the transport media. Wireless communication links 103-104 may use various protocols, such as wireless fidelity, code division multiple access, evolution data optimized, global system for mobile communications, worldwide interoperability for microwave access, long term evolution, internet, telephony, or some other communication format—including combinations thereof.

Wireless base station 102 and communication network 105 communicate over communication link 106. Communication network 105 comprises a core network, data network, Internet, telephony network, media server, or some other communication system—including combinations thereof. Communication link 106 uses metal, glass, air, space, or some other material as the transport media—including combinations thereof. Communication link 106 could use various protocols, such as wireless fidelity, code division multiple access, global system for mobile communications worldwide interoperability for microwave access, internet, Ethernet, telephony, time division multiplex, or some other communication format—including combinations thereof. Communication link 106 may be a direct link or may include intermediate communication networks, systems, or links.

In operation, wireless communication device 101 and wireless base station 102 wirelessly exchange information to provide an audio service to the user of wireless communication device 101. The audio service may comprise telephony, push-to-talk, music downloads, video streaming, media transfers, or some other communication service that includes audio. Audio includes any data that is suitable for audible presentation for a human to hear. In the various methods described below, wireless communication device 101 and wireless base station 102 wirelessly transfer audio samples and power control indicators to dynamically control the wireless transmit power of wireless communication device 101.

Figure 2:
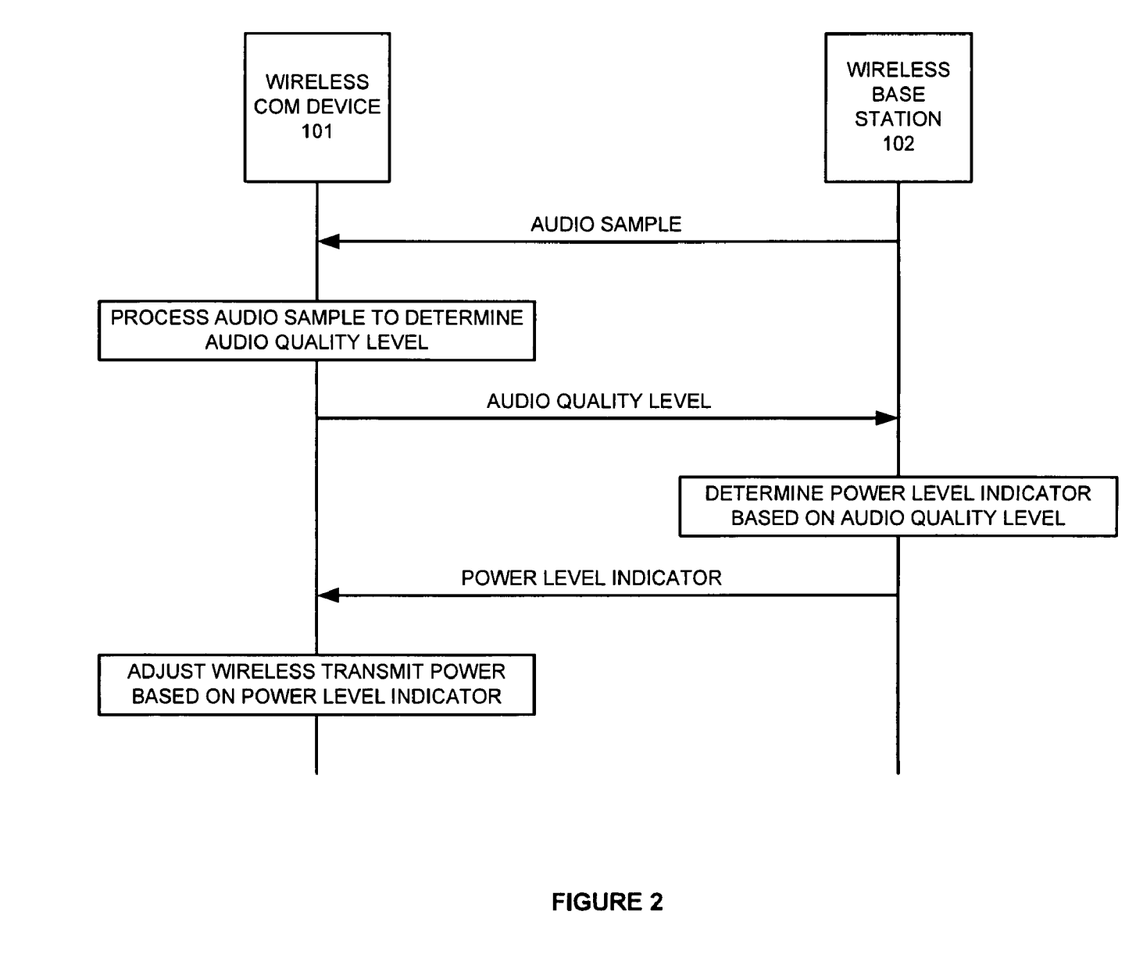
FIG. 2 illustrates a method of operating the wireless communication system.

FIG. 2 illustrates a method of operating wireless communication system 100. Wireless base station 102 wirelessly transfers an audio sample to wireless communication device 101. The audio sample may comprise a tone, voice data, music, video, or some other media content. In some examples, wireless base station 102 transfers the audio sample during a speech pause on forward communication link 103.

Wireless communication device 101 processes the audio sample to determine an audio quality level. The determination of the audio quality level may comprise a comparison to a pre-stored audio file, use of a sound analysis algorithm, or some other method for grading the audio fidelity of the audio sample. In some examples, the audio sample is a tone and the audio quality level is determined through mean opinion scoring as specified by ITU-T recommendation P.800. Typically, wireless communication device 101 inhibits the audio sample from being audibly presented to the user of wireless communication device 101. For example, wireless communication device 101 may recognize a packet marking or a tone frequency that is associated with the audio sample, and in response, device 101 removes or attenuates the audio sample before it reaches a speaker in device 101.

Wireless communication device 101 wirelessly transfers the audio quality level to wireless base station 102. Wireless base station 102 determines a power level indicator for wireless communication device 101 based on the audio quality level. Typically, wireless base station 102 selects a power level indicator to increase transmit power in response to poor audio quality, decrease transmit power in response to excessively good audio quality, and retain current transmit power in response to adequate audio quality. If mean opinion scoring is used, transmit power could be increased or decreased to maintain a target score of 3.2. Base station 102 may also consider other factors for power control, such as system load, noise levels, user quality of service, or some other metric. Wireless base station 102 wirelessly transfers the power level indicator to wireless communication device 101. Wireless communication device 101 adjusts its wireless transmit power in response to the power level indicator.

Figure 3:
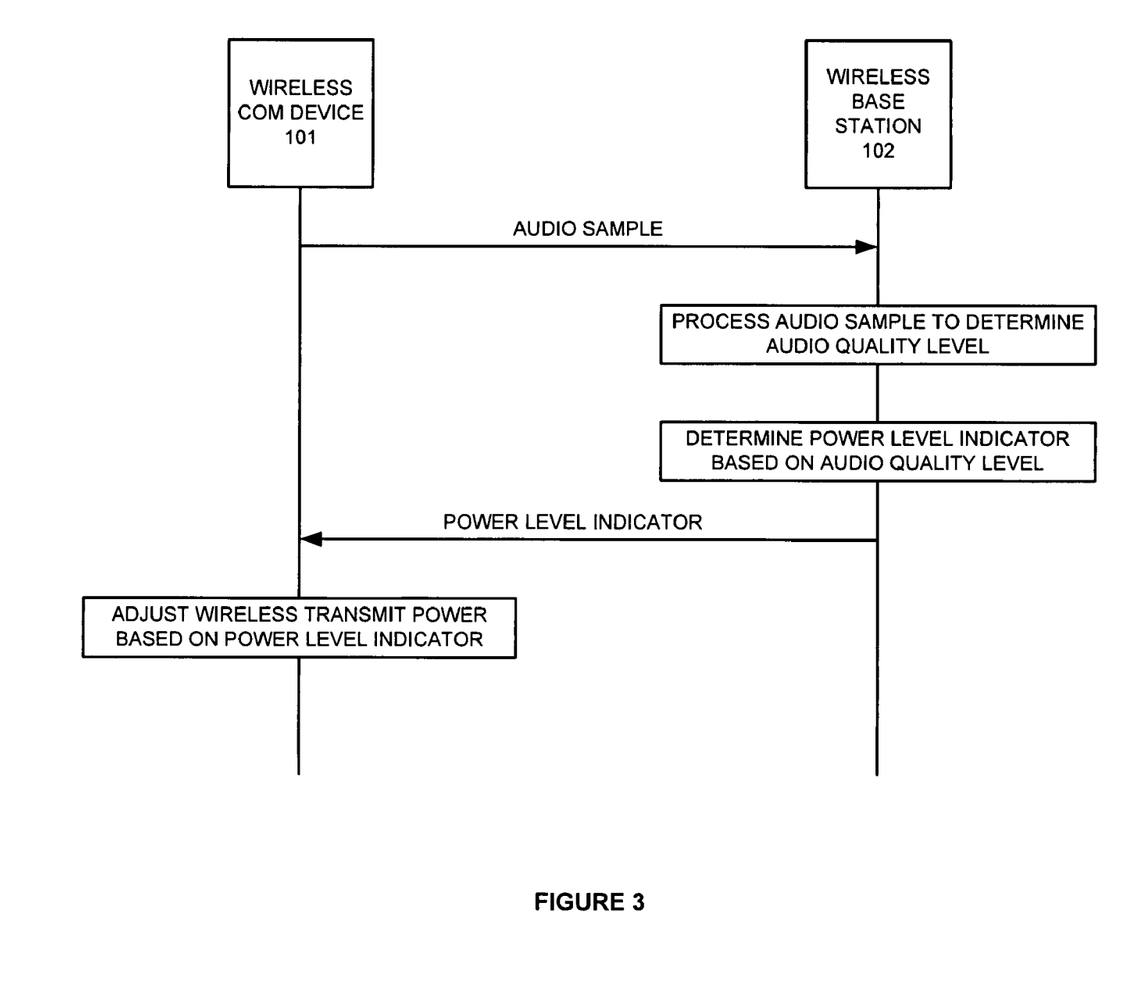
FIG. 3 illustrates a method of operating the wireless communication system.

FIG. 3 illustrates a method of operating wireless communication system 100. Wireless communication device 101 wirelessly transfers an audio sample to wireless base station 102. The audio sample may comprise a tone, voice data, music, video, or some other media content. In some examples, wireless communication device 101 transfers the audio sample during a speech pause on reverse communication link 104.

Wireless base station 102 processes the audio sample to determine an audio quality level. The determination of the audio quality level may comprise a comparison to a pre-stored audio file, use of a sound analysis algorithm, or some other method for grading the audio fidelity of the audio sample. In some examples, the audio sample is a tone and the audio quality level is determined through mean opinion scoring as specified by ITU-T recommendation P.800. Typically, wireless base station 102 inhibits the audio sample from transfer to communication network 105. For example, wireless base station 102 may recognize a packet marking or tone frequency that is associated with the audio sample, and in response, base station 102 removes or attenuates the audio sample before it reaches communication link 106.

Wireless base station 102 determines a power level indicator for the wireless communication device based on the audio quality level. Typically, wireless base station 102 selects a power level indicator to increase transmit power in response to poor audio quality, decrease transmit power in response to excessively good audio quality, and retain current transmit power in response to adequate audio quality. If mean opinion scoring is used, transmit power could be increased or decreased to maintain a target score of 3.2. Base station 102 may also consider other factors for power control, such as system load, noise levels, user quality of service, or some other metric. Wireless base station 102 wirelessly transfers the power level indicator to wireless communication device 101. Wireless communication device 101 adjusts its wireless transmit power in response to the power level indicator.

Figure 4:
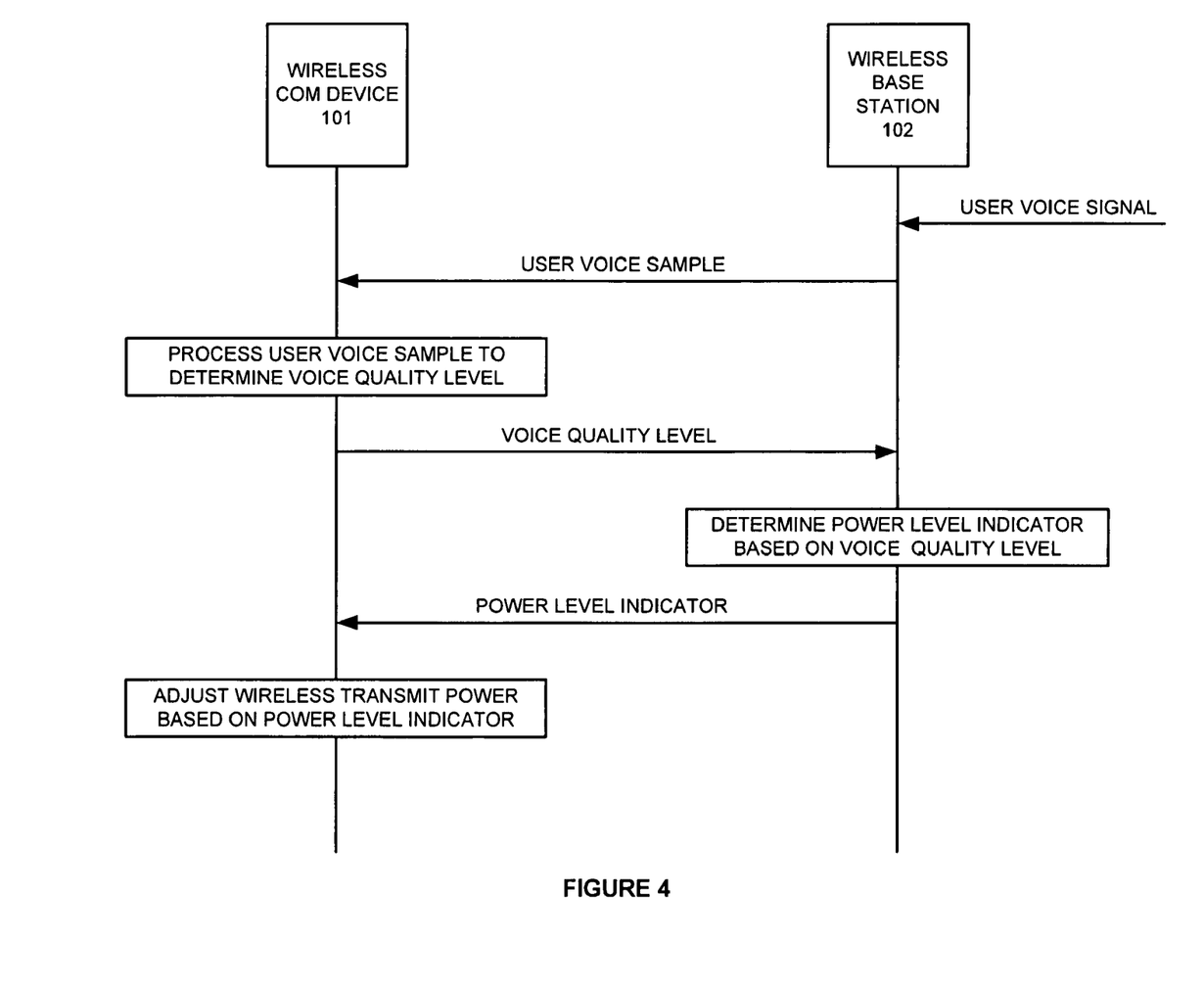
FIG. 4 illustrates a method of operating the wireless communication system.

FIG. 4 illustrates a method of operating wireless communication system 100. Wireless base station 102 receives a user voice signal from communication network 105. This user voice signal is the voice input of a far-end user (not shown) who is audibly communicating with the user of device 101 through communication network 105. Wireless base station 102 generates a user voice sample from the user voice signal. Wireless base station 102 wirelessly transfers the user voice sample to wireless communication device 101. In some examples, wireless base station 102 transfers the user voice sample during a speech pause on forward communication link 103.

Wireless communication device 101 processes the user voice sample to determine a voice quality level. The determination of the voice level may comprise a comparison to a pre-stored voice file, use of a voice analysis algorithm, or some other method for grading the audio fidelity of the voice sample. Typically, wireless communication device 101 inhibits the voice sample from being audibly presented to the user of wireless communication device 101. For example, wireless communication device 101 may recognize a packet marking that is associated with the voice sample, and in response, device 101 removes or attenuates the voice sample before it reaches a speaker in device 101.

Wireless communication device 101 wirelessly transfers the voice quality level to wireless base station 102. Wireless base station 102 determines a power level indicator for wireless communication device 101 based on the voice quality level. Typically, wireless base station 102 selects a power level indicator to increase transmit power in response to poor voice quality, decrease transmit power in response to excessively good voice quality, and retain current transmit power in response to adequate voice quality. Base station 102 may also consider other factors for power control, such as system load, noise levels, user quality of service, or some other metric. Wireless base station 102 wirelessly transfers the power level indicator to wireless communication device 101. Wireless communication device 101 adjusts its wireless transmit power in response to the power level indicator.

Figure 5:
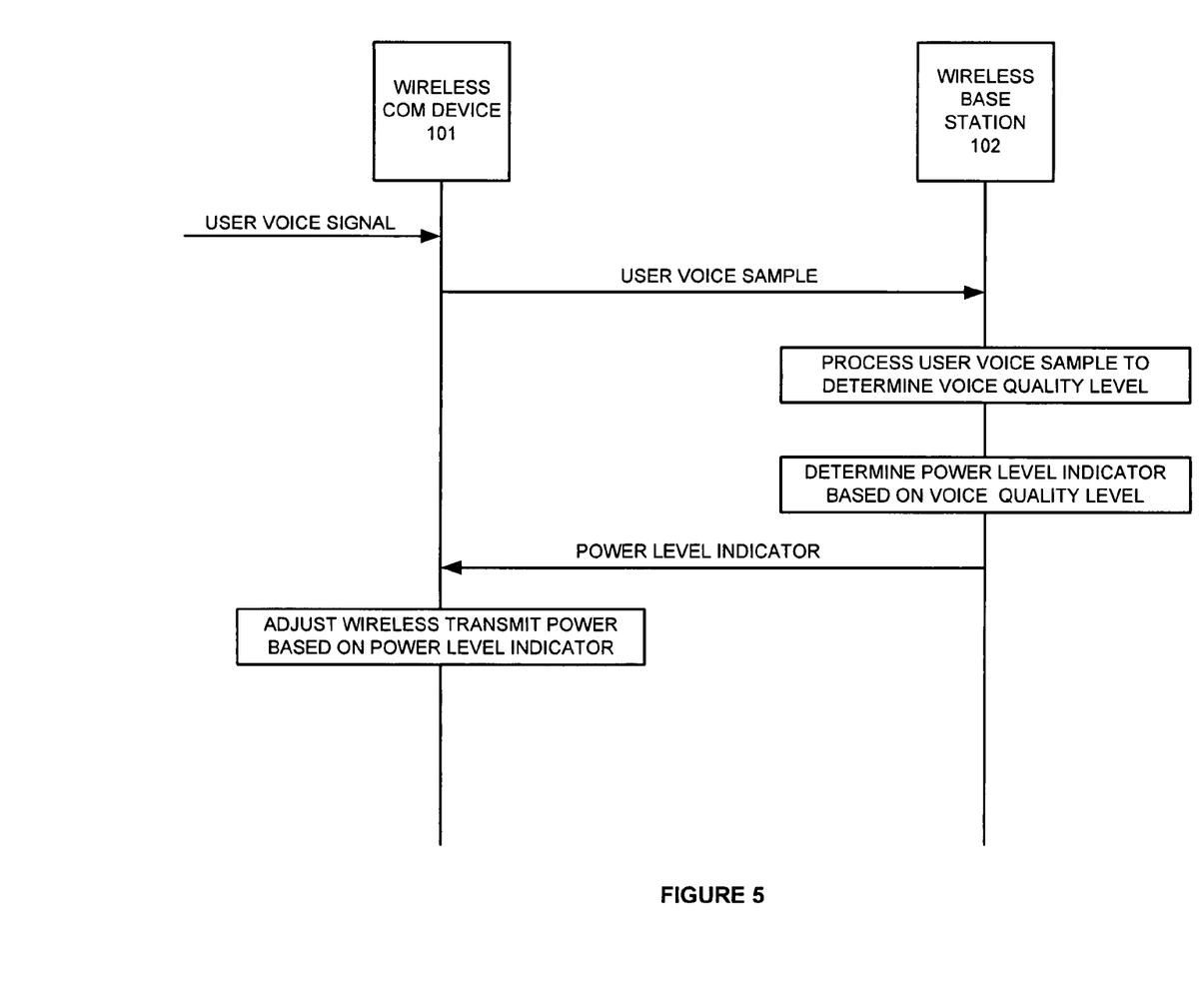
FIG. 5 illustrates a method of operating the wireless communication system.

FIG. 5 illustrates a method of operating wireless communication system 100. Wireless communication device 101 receives a user voice signal from the user who is operating device 101. Wireless communication device 101 generates a user voice sample from the user voice signal. Wireless communication device 101 wirelessly transfers the user voice sample to wireless base station 102. In some examples, wireless communication device 101 transfers the voice sample during a speech pause on reverse communication link 104.

Wireless base station 102 processes the user voice sample to determine a voice quality level. The determination of the voice level may comprise a comparison to a pre-stored voice file, use of a voice analysis algorithm, or some other method for grading the audio fidelity of the voice sample. Typically, wireless base station 102 inhibits the voice sample from transfer to communication network 105. For example, wireless base station 102 may recognize a packet marking that is associated with the voice sample, and in response, base station 102 removes or attenuates the voice sample before it reaches communication link 106.

Wireless base station 102 determines a power level indicator for wireless communication device 101 based on the voice quality level. Typically, wireless base station 102 selects a power level indicator to increase transmit power in response to poor voice quality, decrease transmit power in response to excessively good voice quality, and retain current transmit power in response to adequate voice quality. Base station 102 may also consider other factors for power control, such as system load, noise levels, user quality of service, or some other metric. Wireless base station 102 wirelessly transfers the power level indicator to wireless communication device 101. Wireless communication device 101 adjusts its wireless transmit power in response to the power level indicator.

Figure 6:
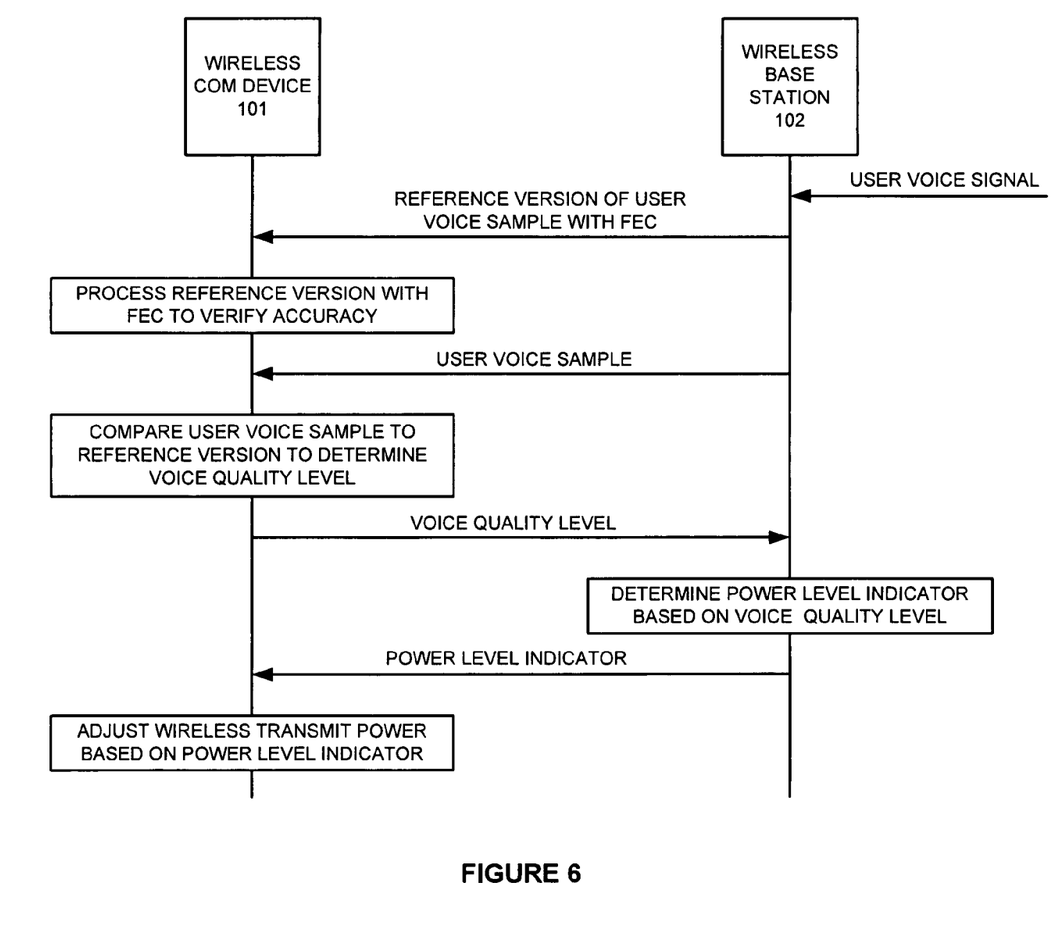
FIG. 6 illustrates a method of operating the wireless communication system.

FIG. 6 illustrates a method of operating wireless communication system 100. Wireless base station 102 receives a user voice signal from communication network 105. This user voice signal is the voice input of a far-end user (not shown) who is audibly communicating with the user of device 101 through communication network 105. Wireless base station 102 generates a reference version of a user voice sample with forward error correction from the user voice signal. Wireless base station 102 wirelessly transfers the reference version of the user voice sample with forward error correction to the wireless communication device 101. Wireless communication device 101 processes the reference version of the user voice sample and the forward error correction to verify the accuracy of the reference version of the user voice sample. Subsequently, wireless base station 102 generates a copy of the user voice sample. Wireless base station 102 wirelessly transfers the copy of the user voice sample to wireless communication device 101. In some examples, wireless base station 102 transfers the reference version and the copy of the voice sample during speech pauses on forward communication link 103.

Wireless communication device 101 compares the copy of the user voice sample to the accurate reference version of the user voice sample to determine a voice quality level. Typically, wireless communication device 101 inhibits the reference version and the copy of the voice sample from being audibly presented to the user of wireless communication device 101. For example, wireless communication device 101 may recognize a packet marking that is associated with the reference version and the copy, and in response, device 101 removes or attenuates the reference version and the copy before they reach a speaker in device 101.

Wireless communication device 101 wirelessly transfers the voice quality level to wireless base station 102. Wireless base station 102 determines a power level indicator for wireless communication device 101 based on the voice quality level. Typically, wireless base station 102 selects a power level indicator to increase transmit power in response to poor voice quality, decrease transmit power in response to excessively good voice quality, and retain current transmit power in response to adequate voice quality. Base station 102 may also consider other factors for power control, such as system load, noise levels, user quality of service, or some other metric. Wireless base station 102 wirelessly transfers the power level indicator to wireless communication device 101. Wireless communication device 101 adjusts its wireless transmit power in response to the power level indicator.

Figure 7:
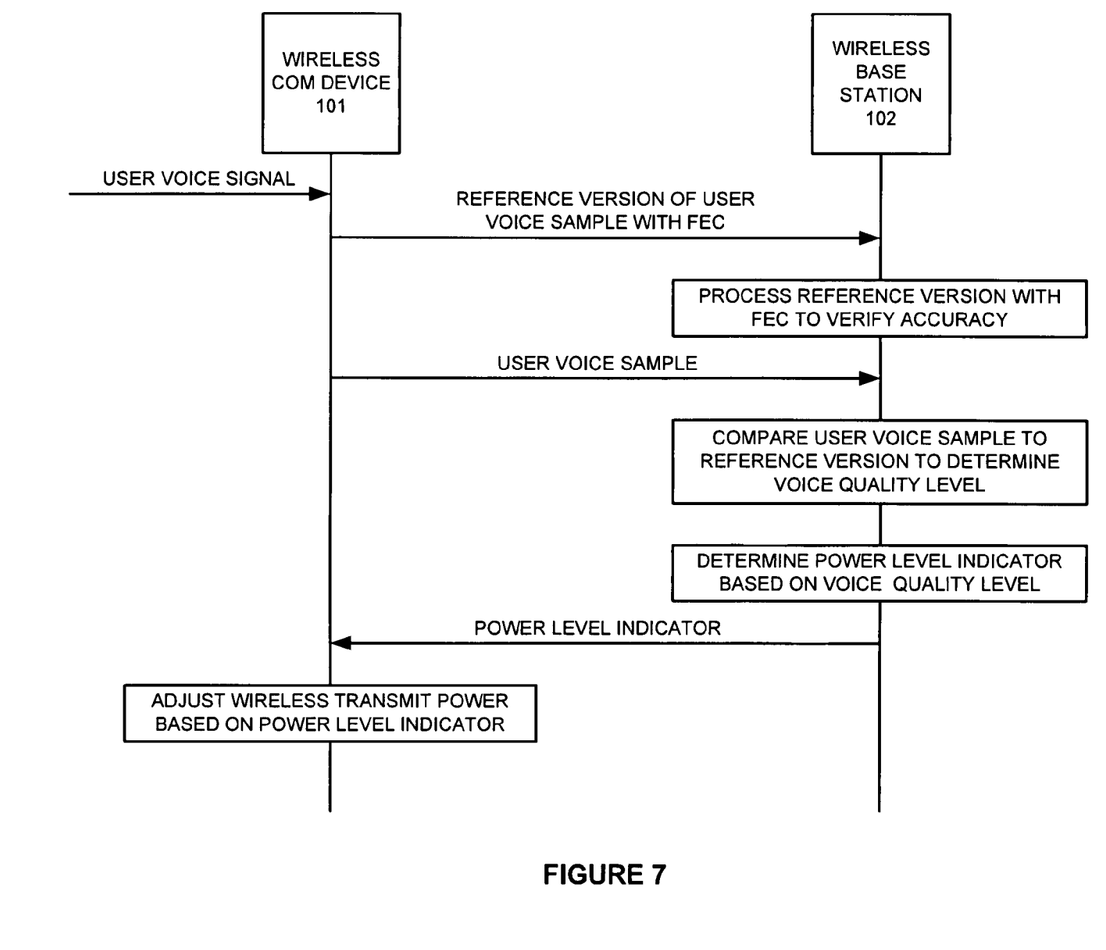
FIG. 7 illustrates a method of operating the wireless communication system.

FIG. 7 illustrates a method of operating wireless communication system 100. Wireless communication device 101 receives a user voice signal from the user who is operating device 101. Wireless communication device 101 generates a reference version of a user voice sample with forward error correction from the user voice signal. Wireless communication device 101 wirelessly transfers the reference version of the user voice sample with forward error correction to wireless base station 101. Wireless base station 102 processes the reference version of the user voice sample with the forward error correction to verify the accuracy of the reference version of the user voice sample. Subsequently, wireless communication device 101 generates a copy of the user voice sample. Wireless communication device 101 wirelessly transfers the copy of the user voice sample to wireless base station 102. In some examples, wireless communication device 101 transfers the reference version and the copy of the voice sample during speech pauses on reverse communication link 104.

Wireless base station 102 compares the copy of the user voice sample to the accurate reference version of the user voice sample to determine a voice quality level. Typically, wireless base station 102 inhibits the reference version and the copy from transfer to communication network 105. For example, wireless base station 102 may recognize a packet marking that is associated with the reference version and the copy, and in response, base station 102 removes or attenuates the reference version and the copy before they reach communication link 106.

Wireless base station 102 determines a power level indicator for wireless communication device 101 based on the voice quality level. Typically, wireless base station 102 selects a power level indicator to increase transmit power in response to poor voice quality, decrease transmit power in response to excessively good voice quality, and retain current transmit power in response to adequate voice quality. Base station 102 may also consider other factors for power control, such as system load, noise levels, user quality of service, or some other metric. Wireless base station 102 wirelessly transfers the power level indicator to wireless communication device 101. Wireless communication device 101 adjusts its wireless transmit power in response to the power level indicator.

Note the methods described above for FIGS. 2-7 can be periodically repeated to periodically adjust the wireless transmit power of wireless communication device 101.

Figure 8:
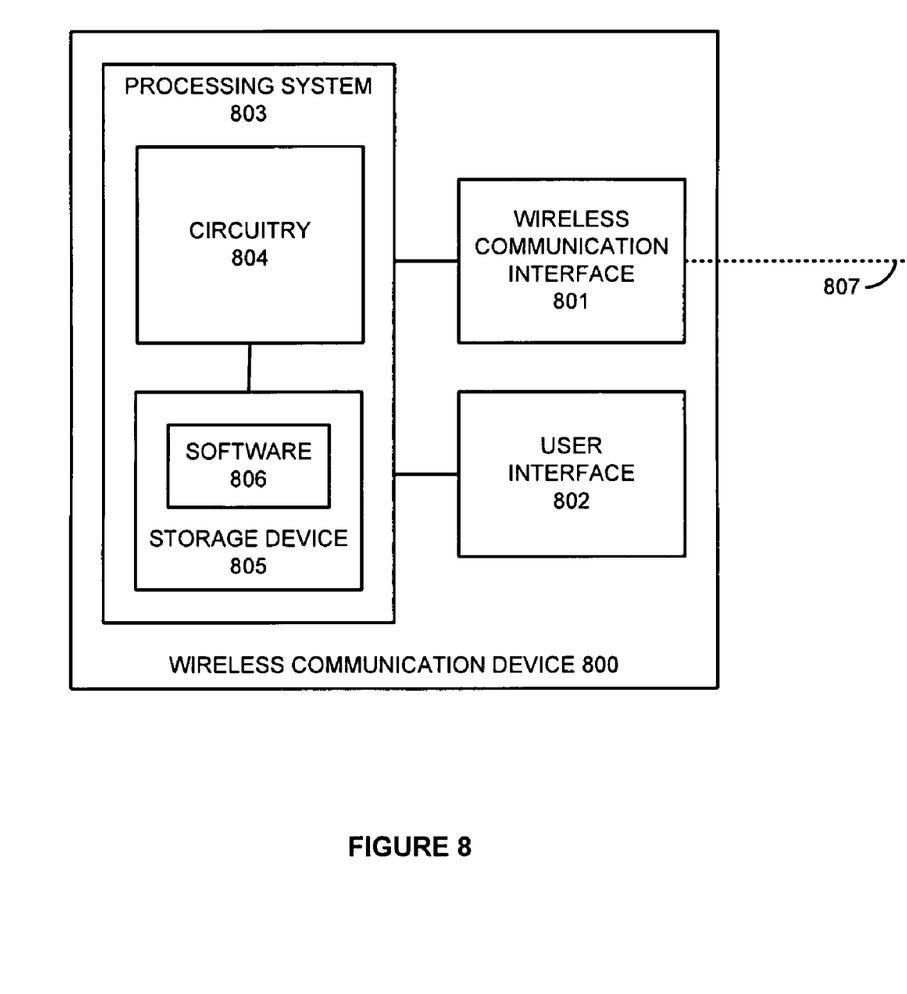
FIG. 8 illustrates a wireless communication device.

FIG. 8 illustrates wireless communication device 800. Wireless communication device 800 provides on example of wireless communication device 101, although wireless communication device 101 may use other configurations. Wireless communication device 800 comprises wireless communication interface 801, user interface 802, and processing system 803. Processing system 803 is linked to wireless communication interface 801 and user interface 802. Processing system 803 includes circuitry 804 and storage device 805 that stores operating software 806.

Wireless communication interface 801 comprises components that transmit and receive wireless Radio Frequency (RF) signals over wireless communication link 807 under the control of processing system 803. These components might include an antenna, transceiver, amplifier, and signal processing circuitry. Wireless communication interface 801 uses an RF transmit power as directed by processing system 803. User interface 802 comprises a speaker, microphone, display, keys, touch-screen, scroll pad, switch, or some other user input/output device—including combinations thereof.

Circuitry 804 comprises microprocessor and associated circuitry that retrieves and executes operating software 806 from storage device 805. Storage device 805 comprises a disk drive, flash drive, memory circuitry, or some other memory device. Operating software 806 comprises computer programs, firmware, or some other form of machine-readable processing instructions. Although storage device 805 is shown within wireless communication device 800, a portion of storage device 805 could be externally located. For example, storage device 805 may comprise an external memory apparatus that stores portions of software 806 for subsequent transfer to an internal disk drive within wireless communication device 800. When executed by circuitry 804, operating software 806 directs processing system 803 to operate wireless communication device 800 as described herein for device 101. In particular, operating software 806 directs processing system 802 to generate or process audio samples to control wireless transmit power based on audio quality levels.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system comprising:
   wirelessly transferring an audio sample and a reference version of the audio sample with forward error correction from a wireless communication device to a wireless base station;
   in the wireless base station, processing the reference version of the audio sample with the forward error correction to verify accuracy of the reference version of the audio sample, processing the audio sample to determine an audio quality level by comparing the audio sample to the reference version of the audio sample, and determining a power level indicator for the wireless communication device based on the audio quality level;
   wirelessly transferring the power level indicator from the wireless base station to the wireless communication device; and
   in the wireless communication device, adjusting wireless transmit power in response to the power level indicator.

2. The method of claim 1 wherein the audio sample comprises a tone and the audio quality level comprises a mean opinion score.

3. The method of claim 1 wherein wirelessly transferring the audio sample from the wireless communication device to the wireless base station comprises transferring the audio sample during a speech pause on a reverse link from the wireless communication device to the wireless base station.

4. The method of claim 1 wherein processing the audio sample in the wireless base station comprises inhibiting the audio sample from external transfer to a communication network.

5. The method of claim 1 further comprising periodically repeating the method to periodically adjust the wireless transmit power of the wireless communication device.

6. A method of operating a wireless communication system comprising:
   in a wireless communication device, receiving a user voice signal from a user and generating a user voice sample from the user voice signal;
   wirelessly transferring the user voice sample and a reference version of the user voice sample with forward error correction from the wireless communication device to a wireless base station;
   in the wireless base station, processing the reference version of the user voice sample with the forward error correction to verify accuracy of the reference version of the user voice sample, processing the user voice sample to determine a voice quality level by comparing the user voice sample to the reference version of the user voice sample, and determining a power level indicator for the wireless communication device based on the voice quality level;
   wirelessly transferring the power level indicator from the wireless base station to the wireless communication device; and
   in the wireless communication device, adjusting wireless transmit power in response to the power level indicator.

7. The method of claim 6 wherein wirelessly transferring the user voice sample from the wireless communication device to the wireless base station comprises transferring the user voice sample during a speech pause on a reverse link from the wireless communication device to the wireless base station.

8. The method of claim 6 wherein processing the user voice sample in the wireless base station comprises inhibiting the user voice sample from external transfer to a communication network.

9. The method of claim 6 further comprising periodically repeating the method to periodically adjust the wireless transmit power of the wireless communication device.

* * * * *